United States Patent

Smetz

Patent Number: 5,690,457
Date of Patent: Nov. 25, 1997

[54] EYEBOLT

[75] Inventor: Reinhard Gerog Erich Smetz, Baldingen, Germany

[73] Assignee: RUD-Kettenfabrik Rieger & Dietz GmbH. u. Co., Aalen-Unterkochen, Germany

[21] Appl. No.: 326,550

[22] Filed: Oct. 20, 1994

[30] Foreign Application Priority Data

Oct. 25, 1993 [DE] Germany .................. 43 36 780.1
Feb. 3, 1994 [DE] Germany .................. 44 03 785.6

[51] Int. Cl.$^6$ .................. F16B 23/00; B25B 13/48
[52] U.S. Cl. .................. 411/400; 411/402; 411/403; 81/436
[58] Field of Search .................. 411/400, 402–407, 411/410; 81/436, 487, 488, DIG. 1; 403/378, 379, 326

[56] References Cited

U.S. PATENT DOCUMENTS

| | | |
|---|---|---|
| 2,748,646 | 6/1956 | Harold et al. .................. 411/400 |
| 4,295,765 | 10/1981 | Burke .................. 411/400 |
| 4,419,785 | 12/1983 | McWhirter .................. 411/400 |
| 4,473,984 | 10/1984 | Lopez .................. 411/400 |
| 4,570,987 | 2/1986 | Wong et al. .................. 411/400 |
| 4,615,554 | 10/1986 | Schilla et al. .................. 411/400 |
| 5,125,861 | 6/1992 | Freeman .................. 411/400 |
| 5,277,531 | 1/1994 | Krivec .................. 81/436 |

FOREIGN PATENT DOCUMENTS 15284 5/1972 Japan .................. 411/400

*Primary Examiner*—Steven N. Meyers
*Assistant Examiner*—Tuyet-Phuong Pham
*Attorney, Agent, or Firm*—Mark P. Stone

[57] ABSTRACT

In order, in an eyebolt, to enable an alignment of the connecting eyelet (2) in the direction of the forces induced in it, the eyebolt comprises two parts disposed rotatably in relation to each other, of which one forms the connecting eyelet (2) and one an anchor bolt (3), the head (6) of which is supported, by means of an annular flange (62), on a supporting surface of the eyelet base (21) of the connecting eyelet (2). The securement of the cohesion of the connecting eyelet (2) and of the anchor bolt (3) is served by at least one locking element (9).

20 Claims, 4 Drawing Sheets

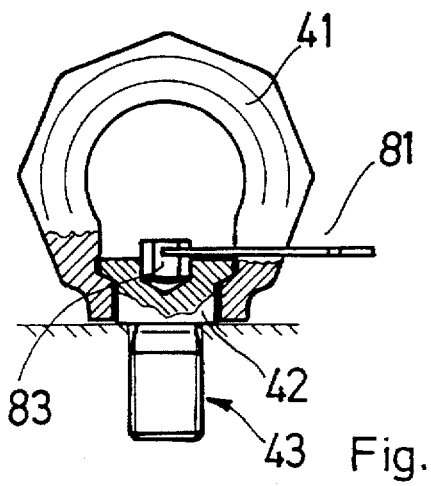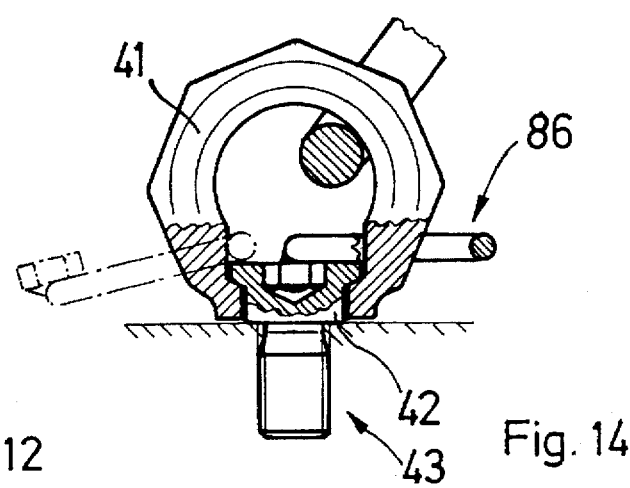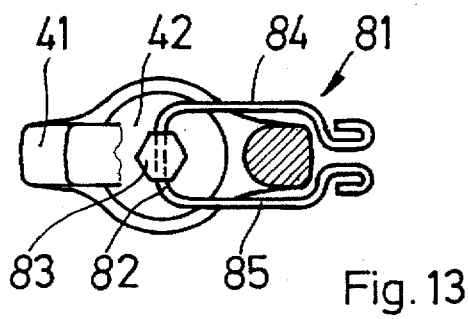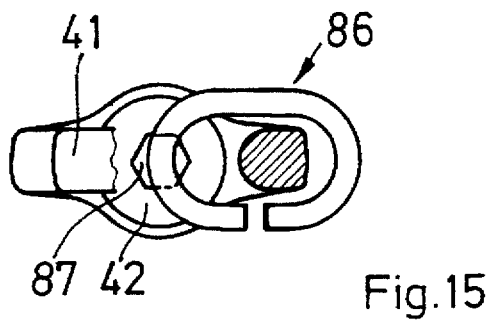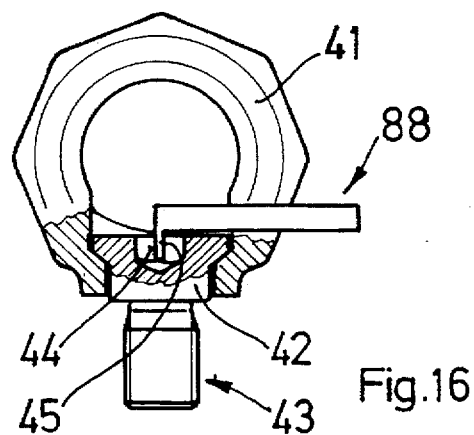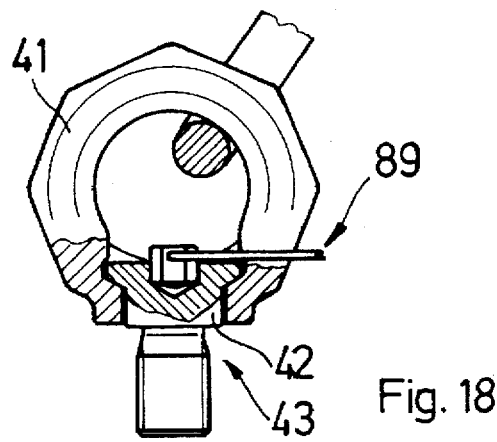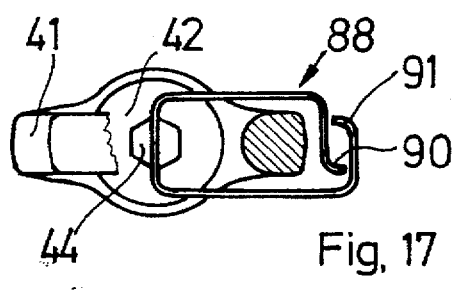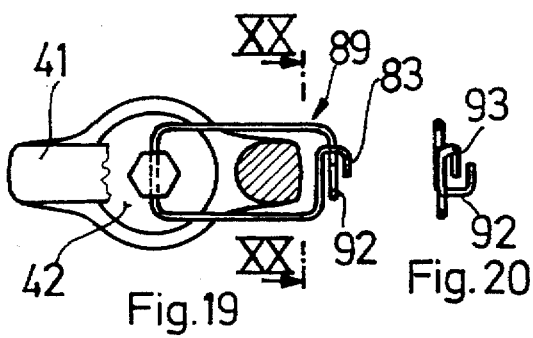

EYEBOLT

BACKGROUND OF THE INVENTION

The invention relates to an eyebolt having a connecting eyelet serving the suspension of a lifting tackle or lashing tackle, and having a threaded journal which serves to fasten it to an object and is supported via a holding member against the bored-through eyelet base and in which, via the holding member, a rotary motion can be induced.

From EP 0 161 652 B1, an eyebolt of the above type is known, which, given obliquely running lifting or lashing tackle in the form of chains or ropes, is able to adjust itself to the direction of the induced force differently from similarly known eyebolts according to DIN 580 and DIN 582. In the case of the known eyebolt, the threaded journal which serves to fasten it to an object is formed by the lower end of a threaded bolt, the upper end of which is likewise configured as a threaded journal, and in the case of which, between the two threaded journals, there is disposed a collar which forms a stop face for that side of the eyelet base facing away from the holding eyelet. On that threaded journal of the threaded bolt which faces the holding eyelet there is screwed a holding member, which is held at a distance relative to the collar disposed between the two threaded journals by a securing element passing through a transverse bore of the threaded journal, which distance guarantees the rotational mobility of the connecting eyelet relative to the threaded bolt. Although the known design fulfils the requirements to be placed upon it in functional terms, it is incapable of providing complete satisfaction inasmuch as it comprises a large number of parts, which, moreover, are relatively complicated, and consequently fails to conform to the pronounced mass-production character of eyebolts.

SUMMARY OF THE INVENTION

The object of the invention is to provide an eyebolt of the considered type which is distinghished by a particularly simple construction and comprises only two parts which can be fitted together. This object is achieved, in an eyebolt of the generic type, by the fact that the threaded journal is part of an anchor bolt, the head of which fashions a cylindrical segment and a thereto adjoined annular flange forming the holding member, the cylindrical segment of the head having a larger diameter than the threaded journal and its end facing away from the annular flange, in the fitted state of the eyebolt, forming a bearing surface protruding over the underside of the connecting eyelet, which underside extends perpendicularly to the longitudinal axis of the anchor bolt.

Shown to be particularly advantageous is an eyebolt to whose connecting eyelet there is connected a screwing tool which can be coupled to the head of the anchor bolt and by means of which, by virtue of the connecting eyelet, a screwing motion can be induced in the anchor bolt.

BRIEF DESCRIPTION OF THE DRAWINGS

Further details and features of the invention are derived from the subclaims and the following description of two embodiments represented in the appended drawing, in which:

FIG. 12 shows once again, partially in section, the side view of a modified eyebolt, FIG. 13 shows the partial top view of the eyebolt according to FIG. 12, FIG. 14 shows, partially in section, the side view of a fifth eyebolt with a tool, FIG. 15 shows the partial top view of the eyebolt according to FIG. 14, FIG. 16 shows, partially in section, the side view of an eyebolt with a screwing tool serving to monitor the torque, FIG. 17 shows the partial top view of the eyebolt and the screwing tool according to FIG. 16, FIG. 18 shows, partially in section, the side view of a further eyebolt with a screwing tool likewise serving to indicate the torque, FIG. 19 shows the partial top view of the eyebolt according to FIG. 18, and FIG. 20 shows a section along the line XX—XX in FIG. 19.

DESCRIPTION OF THE BEST MODES FOR CARRYING OUT THE INVENTION

Figure 1:
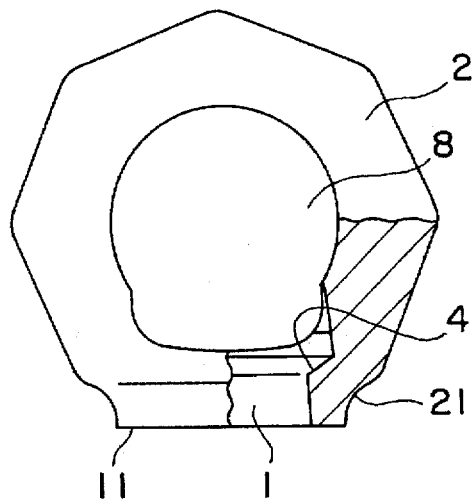
FIG. 1 shows, partially in section, the front side of the connecting eyelet of a first eyebolt.
Figure 2:
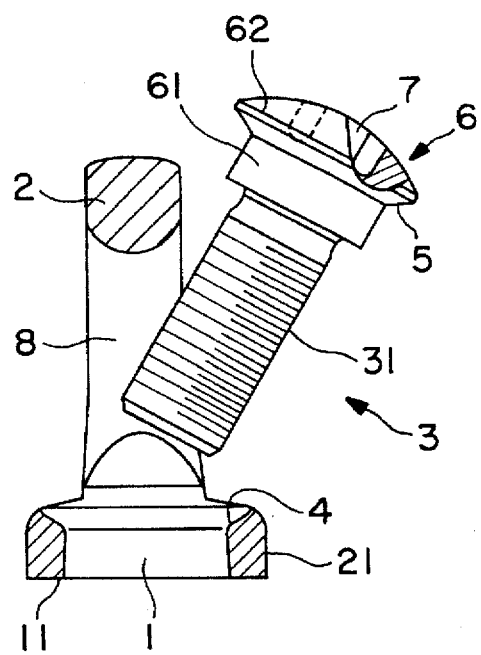
FIG. 2 shows the introduction of a threaded bolt into the connecting eyelet according to FIG. 1.
Figure 3:
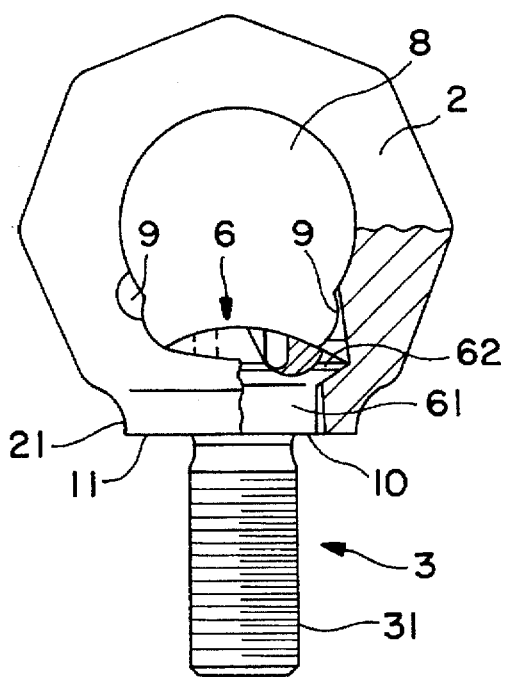
FIG. 3 shows, partially in section, the front view of the parts represented in FIGS. 1 and 2, once these are captively interconnected.
Figure 4:
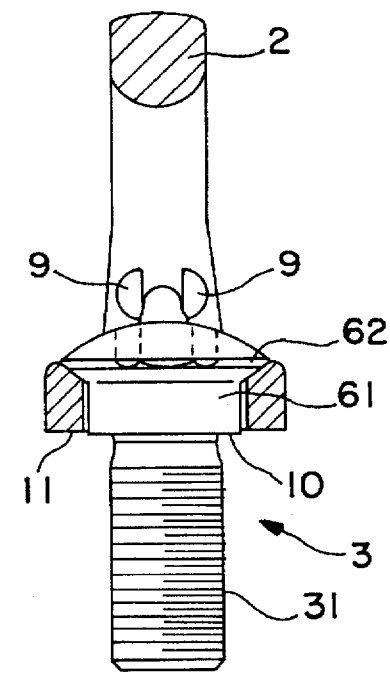
FIG. 4 shows, partially in section, the side view of the eyebolt according to FIG. 3.

FIGS. 1 to 4 show a particularly advantageous embodiment of an eyebolt. In FIG. 1 there is represented the connecting eyelet 2 of an eyebolt prior to connection to an anchor bolt 3, which connecting eyelet is equipped with an insertion opening formed by a bore 1. The connecting eyelet 2 exhibits, in the region of the eyelet base 21, a circumferential supporting surface 4, against which there can come to bear a counter-face 5 of a head 6 disposed at the upper end of the anchor bolt 3. The head 6 has a cylindrical segment 61 and a thereto adjoined annular flange 62. In the head 6 there is located a recess 7 having a hexagon socket, by means of which, using a suitable tool, a rotary motion can be induced in the anchor bolt 3. As can be seen from FIG. 2, the threaded journal 31 of the anchor bolt 3, as the eyebolt is fitted, can be placed without difficulty into the bore 1 and transferred into the position represented in FIGS. 3 and 4. Once the connecting eyelet 2 and anchor bolt 3 have been joined together, projections forming locking elements 9 are fitted, by a heading process in the region of the opening 8 of the connecting eyelet 2, which projections guarantee the captiveness of the anchor bolt 3 relative to the connecting eyelet 2. As a result of the configuration and position of the head 6 of the anchor bolt 3 in the style of a countersunk screwhead, not only is the free space of the opening 8 largely maintained, but the forces transmitted from the connecting eyelet 2 to the head 6 are induced moreover, at a favorable spot, in the anchor bolt 3. FIGS. 3 and 4 show that the lower end of the head 6 forms a bearing surface 10, which protrudes slightly over the underside 11 of the connecting eyelet 2, thereby guaranteeing the rotational mobility of the latter in the fitted state. By virtue of the bearing surface 10, a supporting effect is achieved, which heavily reduces the bending stress upon the anchor bolt 3.

Figures 5, 6:
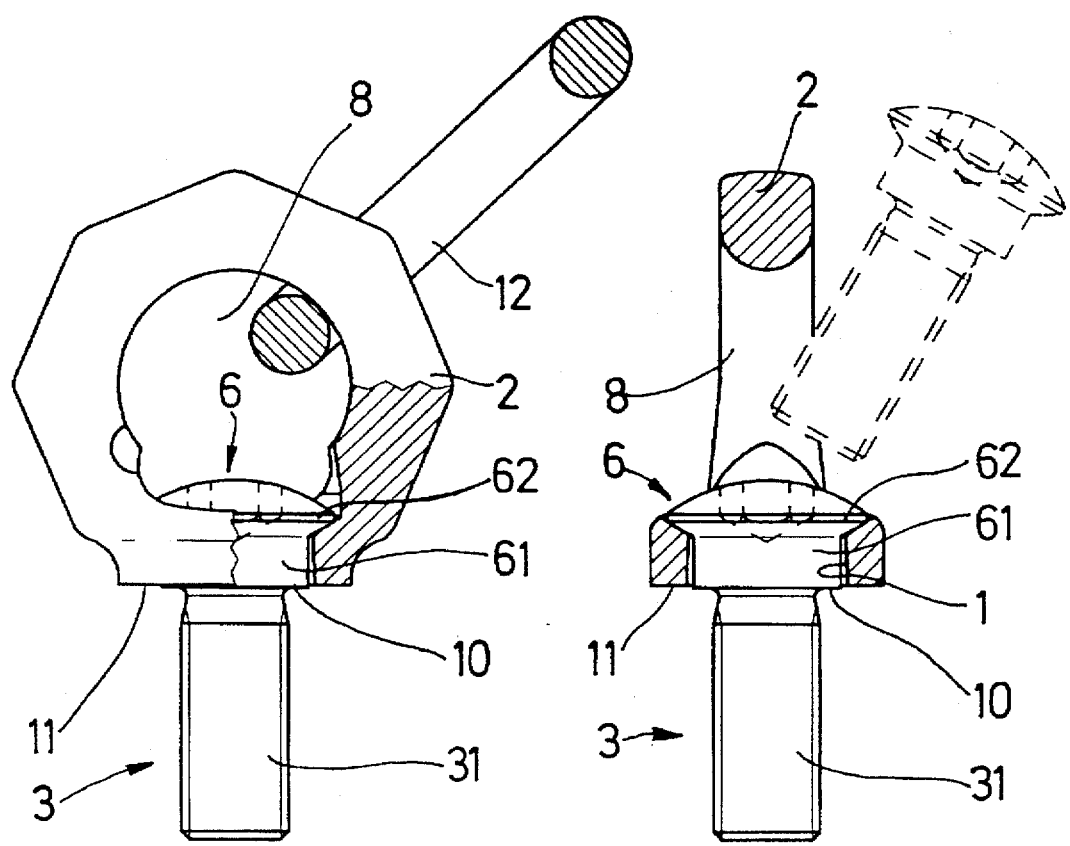
FIG. 5 shows, partially in section, the front view of a modified eyebolt.
FIG. 6 shows, partially in section, the side view of the eyebolt according to FIG. 5.

Instead of securing the captiveness of the anchor bolt 3 by a local plastic deformation of the connecting eyelet 2, to secure the anchor bolt 3 it is also possible for a locking element 12 formed by a transition member to be welded into the connecting eyelet 2, as is shown in the illustrative embodiment according to FIGS. 5 and 6.

Figure 7:
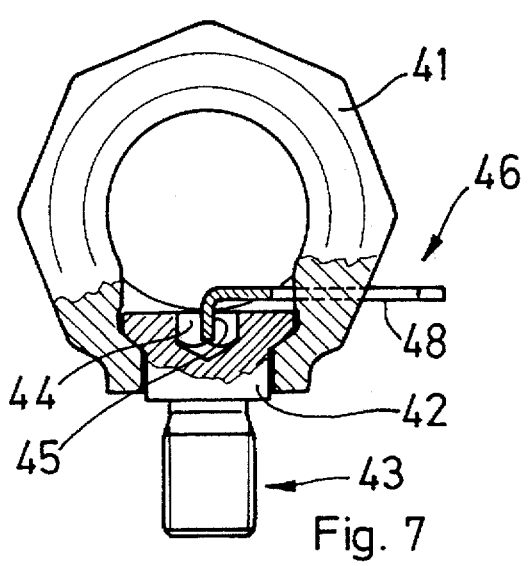
FIG. 7 shows, partially in section, the side view of an eyebolt equipped with a screwing tool.
Figure 8:
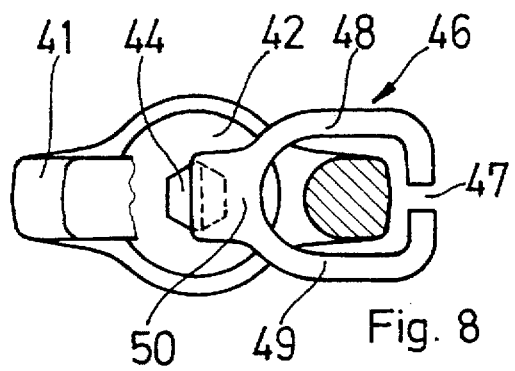
FIG. 8 shows, partially in section, the top view of the eyebolt according to FIG. 7.

In FIGS. 7 and 8, 41 is a connecting eyelet which is mounted, again rotatably, on the head 42 of an anchor bolt 43. The head 42 of the anchor bolt exhibits a hexagon socket 44, to which a screwing part 45 of a screwing tool 46, which screwing part is configured as a bezel, can be temporarily coupled for the transmission of a screwing motion from the connecting eyelet 41 to the anchor bolt 43, thereby enabling assembly and disassembly to be effected in the same way, as is known from one-piece eyebolts. The screwing tool 46 comprises a bow, which is configured as stamped part and exhibiting an opening 47 and the legs 48 and 49 of which are interconnected by a crossbar 50 bearing the screwing part 45. As can be seen from FIG. 8, the opening 47 of the bow is narrower than the width of the cross section of the connecting eyelet 41. This means that the screwing tool 46 is captively connected to the connecting eyelet 41. Because of the elasticity of the material used for the screwing tool 46, it is possible however to widen the opening 47 far enough to enable the screwing tool, where required, to be separated from the connecting eyelet 41 or retrospectively connected thereto.

Figure 9:
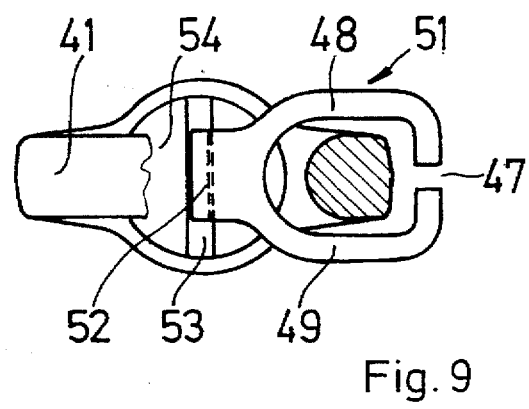
FIG. 9 shows a top view, corresponding to FIG. 8, of a slightly modified eyebolt.

Whilst the screwing part 45 of the screwing tool 46 is relatively narrow, the screwing tool 51 represented in FIG. 9 exhibits a screwing part 52 configured wider than a bezel, which screwing part reaches into the slot 53 of the head 54 of a modified anchor bolt 55.

Figure 10:
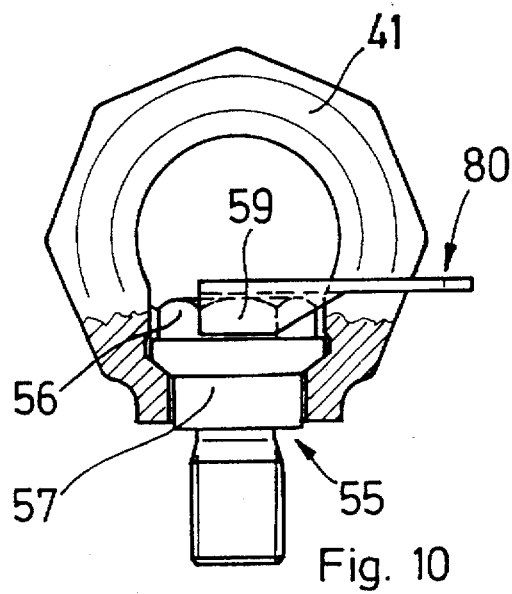
FIG. 10 shows, partially in section, the side view of a further eyebolt provided with a screwing tool.
Figure 11:
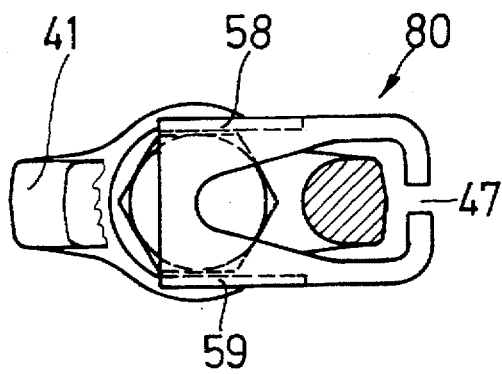
FIG. 11 shows a partial top view of the eyebolt according to FIG. 10.

In FIGS. 10 and 11, a connecting eyelet 41 is captively connected to an anchor bolt 55 configured as a hexagon relief screw. Reaching over the hexagonal relief 56 of the head 57 of this anchor bolt are angled-off flanges 58 and 59 of an again bow-shaped screwing tool 80.

A screwing tool 81, which is bent out of a wire bow connected, in the region of its crossbar 82, to a screwing part 83 formed by a hexagonal nut, is shown by FIGS. 12 and 13. Here too, the legs 84 and 85 are elastically configured, so that, where necessary, the screwing tool 81, which is normally captively connected to the connecting eyelet 41, can be separated from the connecting eyelet 41. A screwing tool 86, comprising an open oval member and a screwing part 87 welded to this oval member, is represented in FIGS. 14 and 15, in FIG. 14 the decoupled, i.e. inactive setting of the screwing tool 86 being indicated by dash-dotted lines.

Finally, in FIGS. 16 to 20, there are shown two screwing tools 88 and 89, which can be used to indicate a desired torque. The screwing tool 88 in question is a stamped spring, the ends of which form stops 90 and 91, which signal to the user, at the moment at which they butt against each other, that the anchor bolt 43 is screwed sufficiently tightly in the bore provided for it.

In place of a stamped spring, in the case of the screwing tool 89, a spring bent out of a round material is used, the hook-shaped ends of which are once again configured as stops 92 and 93. The stops 90, 91 and 92, 93 respectively prevent moreover a plastic deformation of the bow-shaped screwing tools 88 and 89 when the anchor bolt 43 is loosened in cases where fretting corrosion has developed in the region of the thread.

I claim:

1. An eyebolt for lifting or lashing purposes, said eyebolt having a connecting eyelet with an integral base (21) defining an insertion opening (1) for an anchor bolt (3); an anchor bolt comprising a head (6) forming an annular flange (62), a cylindrical segment (61) adjoined to said annular flange (62) and having a smaller diameter than said annular flange (62), and a threaded journal (31) adjoined to said cylindrical segment (61), which threaded journal serves to fasten the eyebolt to an object, the insertion opening forming a circumferential supporting surface (4) at the periphery thereof for a counter-face (5) formed by said annular flange of said head (6);

wherein the cylindrical segment (61) of the anchor bolt (3) has a larger diameter than its threaded journal (31), and wherein the end of the cylindrical segment (61) of the anchor bolt facing away from the annular flange (62), in a fitted state of the eyebolt, forms a bearing surface (10) extending beyond an underside (11) of the base (21) of the connecting eyelet (2) to allow free rotational movement of said connecting eyelet (2) on said cylindrical segment (61) of the anchor bolt (3).

2. The eyebolt as claimed in claim 1, wherein mutually touching faces of the annular flange of the head of the anchor bolt and of the eyelet base are conically configured.

3. The eyebolt as claimed in claim 2, wherein the anchor bolt is configured as a hexagon socket screw.

4. The eyebolt as claimed in claim 1, wherein the anchor bolt is configured as a hexagon socket screw.

5. The eyebolt as claimed in claim 1, wherein the anchor bolt can be inserted, from that side of the eyelet base facing the connecting eyelet, into the insertion opening of the eyelet base.

6. The eyebolt as claimed in claim 1, wherein securement of the anchor bolt in the insertion opening of the eyelet base is provided by at least one locking element restricting axial mobility of the anchor bolt.

7. The eyebolt as claimed in claim 6, wherein the locking element is formed by a transition member welded into an opening of the connecting eyelet.

8. The eyebolt as claimed in claim 6, wherein the locking element is formed by a projection of the connecting eyelet, which projection forms a stop for the head of the anchor bolt.

9. The eyebolt as claimed in claim 6, wherein the anchor bolt can be inserted, from that side of the eyelet base facing the connecting eyelet, into the insertion opening of the eyelet base.

10. The eyebolt as claimed in claim 1, wherein to the connecting eyelet there is connected a screwing tool which can be coupled to the head of the anchor bolt and by means of which, by virtue of the connecting eyelet, a screwing motion can be induced in the anchor bolt.

11. The eyebolt as claimed in claim 10, wherein the screwing tool comprises a bow, which serves to hold it against the connecting eyelet, and a screwing part.

12. The eyebolt as claimed in claim 11, wherein the screwing tool exhibits a bow comprising a bent wire segment.

13. The eyebolt as claimed in claim 11, wherein the screwing tool is configured as a stamped part.

14. The eyebolt as claimed in claim 11, wherein the bow includes legs defining a space between free ends of the legs, and the legs are deformable for temporarily altering the space between the free ends of the legs.

15. The eyebolt as claimed in claim 11, wherein an opening of the bow is narrower than a smallest width of a cross section of the connecting eyelet.

16. The eyebolt as claimed in claim 11, wherein said bow includes a crossbar, and the screwing part is disposed in the region of the crossbar of the bow.

17. The eyebolt as claimed in claim 16, wherein an opening of the bow is narrower than a smallest width of a cross section of the connecting eyelet.

18. The eyebolt as claimed in claim 10, wherein the screwing tool is configured as a torque indicator.

19. The eyebolt as claimed in claim 18, wherein the screwing tool has two legs, which can be elastically spread apart by amounts limited by a pair of stops and a maximum spread setting of which corresponds to that limit torque which allows the anchor bolt to be screwed in.

20. The eyebolt as claimed in claim 19, wherein each of the pair of stops is of hook-shaped configuration.

* * * * *